Figure 1:
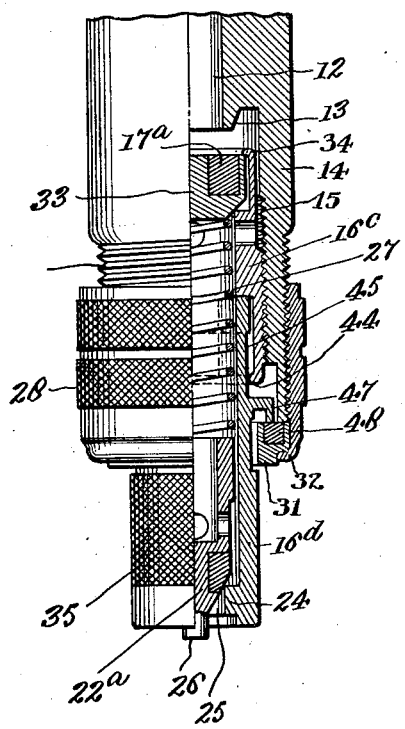

July 5, 1932. A. J. MICHELIN 1,865,580
PNEUMATIC TIRE VALVE
Filed Sept. 10, 1930

Inventor
André Jules Michelin
by Wilkinson & Mawhinney
Attorneys.

Patented July 5, 1932

1,865,580

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

PNEUMATIC TIRE VALVE

Application filed September 10, 1930, Serial No. 481,055, and in France September 18, 1929.

The present invention relates to improvements in pneumatic tire valves and involves certain improvements over the present standard type of valve.

The present pneumatic tire valves are closed by removable caps, which screw on to the stem of the valve and are designed to insure air-tight closure. When it is desired to inflate the tire or to apply a gauge for ascertaining the pressure, it becomes necessary to unscrew and remove the cap completely. Such removal entails numerous drawbacks well known to those familiar with motor cars. Among such drawbacks might be mentioned:

First: The difficulty of unscrewing the cap because of its small size and the ease with which it may be lost. Under this heading may also be mentioned the difficulty in grasping the small cap in the fingers, especially when it is jammed by mud or other foreign matter.

Second: The difficulty of screwing the cap on again. This arises because of the inaccessibility of the valves and because the screw threads are deformed, become rusted or clogged with dirt and other foreign matter, or because the cap itself becomes slightly deformed.

By reason of these drawbacks, users consider the unscrewing and screwing on again of the cap as a troublesome operation so that as a practical matter such users will check the pressure and inflate the tires only at infrequent intervals of time. Furthermore, it frequently happens that the valve is not airtight by reason of the damaged condition of the packing ring of the cap or of the screw threads of the valve stem.

It is an object of the present invention to overcome these drawbacks by doing away with the old form of cap and by providing a rotary barrel construction which upon rotation will either open or close a main valve which will be in addition to the ordinary spring-pressed valve insides carried within the tubular barrel.

It is a further object of the invention to provide an improved barrel-valve structure so designed that by unscrewing the same a few turns, the pressure may be taken and the tire inflated without it being necessary to separate the barrel-valve completely from the valve body.

With the foregoing and other objects in view, the invention will be more fully described hereinafter, and will be more particularly pointed out in the claims appended hereto.

In the drawing, wherein like symbols refer to like or corresponding parts throughout the several views.

Figure 2:
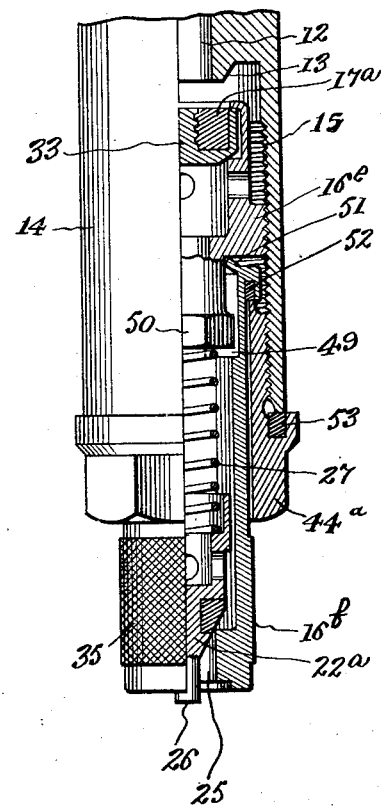

Figure 1 is a side elevation with parts broken away showing a form of valve structure according to the present invention, and Figure 2 is a similar view showing a modification.

Referring more particularly to the drawing, and more particularly for the present to Figure 1, 12 designates the inner duct of the valve around which is disposed a seat 13. The valve body is extended into a cylindrical portion or housing 14 having therein an internal screw thread 15.

A valve $22^a$ is carried loosely within the hollow cylindrical outer barrel part $16^d$ near the outer end thereof and is adapted to close against a seat formed in a diaphragm 24 at the outer end of said barrel part $16^d$.

Through this diaphragm is an opening 25 to permit the entrance and escape of air. The valve stem is indicated at 26 and is adapted to project outwardly from the outer barrel part $16^d$ for engagement by the finger or a tool whereby to depress the valve $22^a$ away from its seat. The valve $22^a$, its stem 26 and a spring 27 constitute the valve insides. The valve $22^a$ is kept up to its seat yieldably by the coil spring 27 contained within the barrel parts.

An external nut 28 is screwed upon external threads 29 upon the valve housing 14. This nut 28 carries at its outer end a plastic joint material or packing 48 held in a metallic or other support 31 confined in place by the inwardly turned edge 32 of the nut 28. This packing 48 is wider than the thickness of the housing 14 and it extends across the outer edge of the housing 14 and across the upper edge of the flange 47 extending out from the outer barrel part 16$^d$ whereby to form a tight joint and seal between the nut 28 and the housing 14 on the one hand, and the outer barrel part 16$^d$ and the housing 14 on the other hand.

The main valve consists of a packing 17$^a$ fitted in a support 33 held inside the inner barrel part 16$^c$ by the inwardly turned edge 34.

The turned-in flanges 32 and 34, used for both the packings 48 and 17$^a$, have the advantage of preventing rotation of the packing when in contact with the respective seats at the time of screwing the packings tightly against such seats, thus eliminating an important cause of premature damage to the said packings.

The outer part of the barrel 16$^d$, which projects from the housing 14, is provided with a milled surface 35 on which an inflator connection with peripheral grip can be adapted. This milled surface 35 further serves for rotating the barrel part 16$^d$ by hand.

The barrel is formed of two parts 16$^c$ and 16$^d$. A finger 44 on the section 16$^c$ engages in a groove 45 on the section 16$^d$ whereby the two sections are compelled to rotate together but are permitted a relative axial sliding. In other words, the section 16$^d$ may rotate but does not partake of any axial movement. The inner section 16$^c$ is of course fed along the screw threads 15 when rotated as is necessary to open and close the valve 17$^a$.

The part 47 will always engage the joint seat or packing 48 so that there will be a seat provided at the outer part of the valve no matter what the position of the valve may be, that is whether it be opened or closed, or if desired the barrel parts or sections may be hexagonal where they overlap so as to cause one part to rotate with the other, but at the same time allowing axial sliding movement of the inner section 16$^c$ in order to open and close the valve 17$^a$.

This hexagonal construction is shown more particularly in Figure 2 where the two sections or parts of the barrel are indicated at 16$^e$ and 17$^f$. According to this form, a hexagonal socket 49 is provided in one section and a hexagonal head 50 upon the other section, the head fitting slidably within the socket 49 and being confined in place by an inwardly turned lip 51. The outer section 16$^f$ is capable of rotation but not axial sliding. However, when the section 16$^f$ is rotated, by reason of the walls of the hexagonal socket 49 engaging with the corresponding walls of the hexagonal head 50, a like rotation will be imparted to the inner section 16$^e$. Consequently, the inner section 16$^e$ will be fed along the screw threads 15 as is necessary to open and close the valve 17$^a$.

In this case, packings 52 and 53 are provided. These packings are constantly sealed without regard to the opened or closed position of the valve. The packing 52 is carried by the outer barrel part 16$^f$ and is engaged and pressed upon by the inner reduced end of a packing nut or gland 44$^a$ which is externally screw threaded to screw into the housing 14 upon the threads 15. The packing nut 44$^a$ carries the packing 53 in position to squeeze such packing against the outer edge of the housing 14. The packing 52 will seal the space between the packing nut 44$^a$ and the outer barrel part 16$^f$. The other packing 53 will seal the space between the packing nut 44$^a$ and the housing 14.

In the use of the device, it is simply necessary to rotate the outwardly exposed outer barrel part 16$^d$ or 16$^f$, which causes a similar rotation of the inner barrel part 16$^c$ or 16$^e$, thus moving the main valve 17$^a$ either away from or against its seat 13. The interior air chamber of the tire will still be protected by the check valve or the valve insides 22$^a$. However, a gauge may be placed against the outer end of the outer barrel part which will act to depress the stem 26 and thus the gauge will be placed in communication with the internal air pressure. A hose nozzle may be also placed in a similar position whereby to force air into the tire. As soon as the gauge or nozzle is removed, the valve 22$^a$ will snap back on its seat and prevent any escape of pressure. The operator may thereupon rotate the outer barrel part in a proper direction to force the main valve 17$^a$ against its seat 13 so that there will be a positive seal of the pressure in a manner somewhat similar to that now had by external and removable valve caps but to a more effective degree and not attended by the annoyances encountered in the use of the valve cap.

It will be obvious that various changes might be made in the construction, combination and arrangement of parts which could be used without departing from the spirit of my invention, and I do not mean to limit the invention to such details, except as particularly pointed out in the claims.

Having thus described my invention, what I claim and desire to secure by Letters Patent of the United States is:

1. In a pneumatic tire valve, a housing having a valve seat, a two part barrel in said housing, the housing and the inner barrel part having interengaging threads, the outer barrel part being mounted for rotation in the housing without axial movement, a slidable noncircular connection between said barrel parts whereby upon rotation of the outer, the inner will be rotated and advanced on the threads of the housing, a valve member on the inner part adapted upon advance of said barrel part to engage the valve seat, a rotary packed joint between the housing and the outer barrel part, said barrel parts being provided with an air duct therethrough, and a valve insides in said duct.

2. In a pneumatic tire valve, a housing having a valve seat, a two part barrel in said housing, the housing and the inner barrel part having interengaging threads, the outer barrel part being mounted for rotation in the housing without axial movement, a slidable noncircular connection between said barrel parts whereby upon rotation of the outer, the inner will be rotated and advanced on the threads of the housing, a valve member on the inner part adapted upon advance of said barrel part to engage the valve seat, said outer barrel part having a flange adjacent the free end of the housing, a rotary packed joint spanning the outer end of the housing and said flange, means to hold the packed joint tightly in place, said barrel part being provided with an air duct therethrough, and a valve insides in said duct.

3. In a pneumatic tire valve, a housing having a valve seat, a two part barrel in said housing, the housing and the inner barrel part having interengaging threads, the outer barrel part being mounted for rotation in the housing without axial movement, a slidable noncircular connection between said barrel parts whereby upon rotation of the outer, the inner will be rotated and advanced on the threads of the housing, a valve member on the inner part adapted upon advance of said barrel part to engage the valve seat, a packing nut screwed into the housing between the housing and outer barrel part, a packing between the outer edge of the housing and said nut, a rotary packed joint between the inner portions of the nut and outer barrel part, said barrel parts being provided with an air duct therethrough, and a valve insides in said duct.

ANDRÉ JULES MICHELIN.